United States Patent

Okuizumi

[11] Patent Number: 5,815,219
[45] Date of Patent: Sep. 29, 1998

[54] LARGE SCREEN VIDEO DISPLAY SYSTEM AND TELEVISION RECEIVER

[75] Inventor: Kiyoshi Okuizumi, Sapporo, Japan

[73] Assignee: Matsushita Electric Industrial Co., Ltd., Osaka, Japan

[21] Appl. No.: 317,126

[22] Filed: Oct. 3, 1994

[30] Foreign Application Priority Data

Dec. 22, 1993 [JP] Japan .................................. 5-324915

[51] Int. Cl.$^6$ .............................. H04N 5/06; H04N 9/06
[52] U.S. Cl. ..................... 348/725; 348/552; 348/738; 348/745; 381/28
[58] Field of Search ................................... 348/552, 725, 348/738, 745, 747, 777, 789, 706, 744, 734, 705; 381/24, 27, 28; 359/146, 145, 148; 340/825.22, 825.25, 825.24, 825.69, 825.72; H04N 5/00; H03J 9/06

[56] References Cited

U.S. PATENT DOCUMENTS

| | | | |
|---|---|---|---|
| 4,488,179 | 12/1984 | Krüger et al. ........................... 348/706 |
| 4,716,409 | 12/1987 | Hart et al. ........................... 340/825.22 |
| 4,808,992 | 2/1989 | Geyers et al. ........................... 348/706 |
| 4,951,151 | 8/1990 | Sorenson et al. ....................... 348/744 |
| 4,989,081 | 1/1991 | Miyagawa et al. ................. 340/825.25 |
| 5,097,324 | 3/1992 | Tanaka et al. ........................... 348/745 |
| 5,134,491 | 7/1992 | Muraji et al. ........................... 348/744 |
| 5,197,100 | 3/1993 | Shiraki .................................... 348/738 |
| 5,339,110 | 8/1994 | Hara et al. ............................... 348/738 |
| 5,396,546 | 3/1995 | Remillard ................................ 348/552 |
| 5,446,505 | 8/1995 | Chang Soo et al. .................... 348/738 |
| 5,500,794 | 3/1996 | Fujita et al. ....................... 340/825.22 |
| 5,579,221 | 11/1996 | Mun .................................... 340/825.37 |

FOREIGN PATENT DOCUMENTS

| | | | |
|---|---|---|---|
| 62-59469 | 3/1987 | Japan ............................... H04N 5/00 |
| 4-282997 | 10/1992 | Japan ............................... H04N 5/00 |
| 4-316298 | 11/1992 | Japan ............................... H04N 5/00 |
| 1584111 | 2/1981 | United Kingdom ............. G08B 9/00 |
| 2092347 | 8/1982 | United Kingdom ............. H03J 9/00 |
| 2162978 | 2/1986 | United Kingdom ............. H03J 9/06 |
| 2191643 | 12/1987 | United Kingdom ............. H03J 9/06 |
| 2197104 | 5/1988 | United Kingdom ............. H03J 9/06 |
| 2251970 | 7/1992 | United Kingdom ........... G08C 19/00 |

OTHER PUBLICATIONS

Search report dated Nov. 24, 1994.

*Primary Examiner*—John K. Peng
*Assistant Examiner*—Jeffrey S. Murrell
*Attorney, Agent, or Firm*—Ratner & Prestia

[57] ABSTRACT

A television receiver for automatically determining from a command issued from a controller, the control of power on/off, picture brightness and picture contrast of a video projector using a video projector controller contained in the television receiver and for controlling the deployment and retraction of a screen using a screen controller also contained in the television receiver.

10 Claims, 5 Drawing Sheets

LARGE SCREEN VIDEO DISPLAY SYSTEM AND TELEVISION RECEIVER

BACKGROUND OF THE INVENTION

1. Field of the Invention

The present invention relates to a control system for a large screen video display system including a television receiver which controls different components composing the large screen video display system.

2. Description of the Prior Art

A need has developed to use audio and video components simultaneously. When users want to control a large screen video display system including different components, a user must manually operate or remotely control each component in the system. Since the components included in a large screen video display system have more functions, one or two remote controls are provided for each component to simplify and reduce the difficulties of operating the components and to provide control of the components from a remote location. As a result of the multitude of functions available for the different components, the operation of the system becomes complex or difficult. In order to diminish this defect and to simplify control of the components from a remote location, one or two exclusive remote control components are provided for each component.

The remote control is usually composed of a main remote control and a sub remote control. In the subremote control the functions which are frequently used are united and the number of keys are reduced as much as possible.

One remote control method has been introduced to make the complicated operation of the components easy so that users can easily operate the components. However, the system using this method becomes larger when the number of components increases. Accordingly, the number of remote control components proportionally increases. A large screen video display system composed of, for example, ten components has 10 to 20 remote control components because each component provides one or two remote control components. As a result, when there are so many remote controls, the number of times the remote control components are operated increases and it is difficult to distinguish which remote control is for which component. As a result, the merit of the remote control method is lost.

SUMMARY OF THE INVENTION

This invention relates to a television receiver, which is easy to operate and which controls others components connected to the television receiver through an exclusive remote control unit, and relates to a large screen video display system including the television receiver.

The large screen video display system in accordance with the exemplary embodiment of the present invention includes components which are linked to each other and controlled by a remote control unit.

The television receiver is the center of the system. When a user sends a control signal through the remote control unit provided in the television receiver, the television receiver automatically judges and automatically controls the other components connected to the television receiver.

DESCRIPTION OF THE PREFERRED EMBODIMENTS (First exemplary embodiment)

Figure 1:
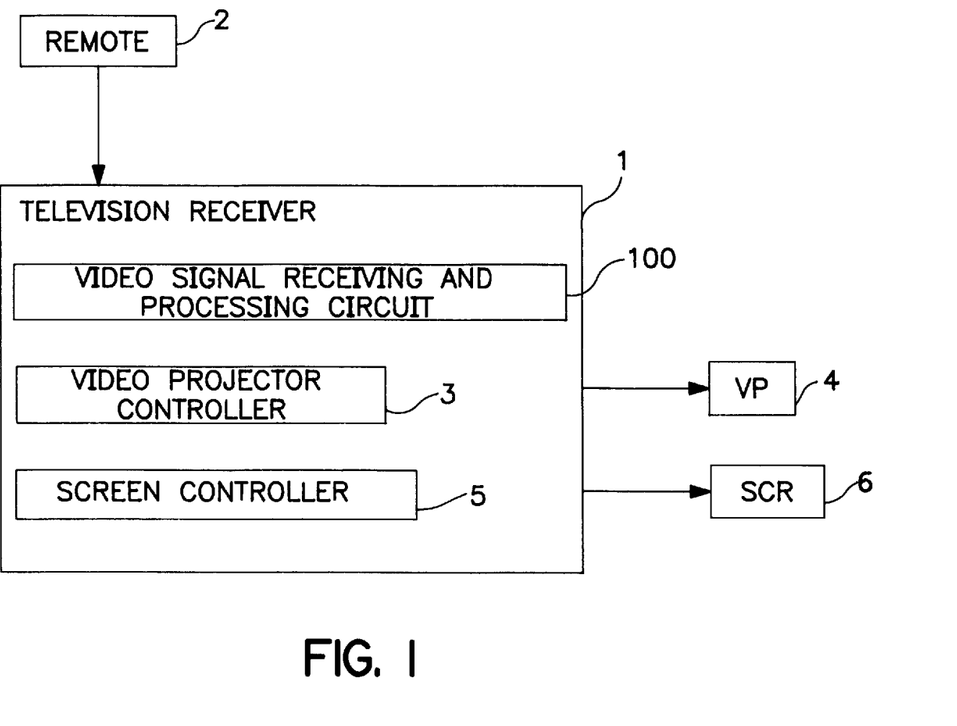
FIG. 1 is a block diagram of a large screen video display system in accordance with a first exemplary embodiment of the present invention.

FIG. 1 is a block diagram of a large screen video display system in accordance with a first exemplary embodiment of the present invention. The television receiver 1 includes a video projector controller 3 and a screen controller 5. The television receiver also includes a video signal receiving and processing circuit 100 which receives and transmits a television signal and a video signal of a video cassette recorder and a laser disk player, etc.

A video projector 4 and a screen 6 are connected to the television receiver 1 as external components of the television receiver 1. The video projector 4, screen 6 and television receiver 1 compose a large screen video display system.

In the above configuration, the user sends a command signal to the television receiver 1 through the remote control 2. After receiving the command signal, the television receiver 1 automatically judges and automatically controls the video projector 4 and the screen 6 through the video projector controller 3 and the screen controller 5.

For example, when the user commands the television receiver 1 to turn on the system, the television receiver 1 automatically performs a series of actions, for example, to make the video projector 4 turn on and to draw down the screen 6 to the designated position. When the user commands the television receiver 1 to turn off the system, the television receiver 1 automatically performs a series of actions, for example, to make the video projector 4 turn off and to pull up the screen 6 to its original position.

Alternatively, the screen may be concealed behind a curtain instead of being rolled up. In this case, the television receiver would perform a series of actions to draw back the curtain so that the screen can be viewed.

(Second exemplary embodiment)

Figure 2:
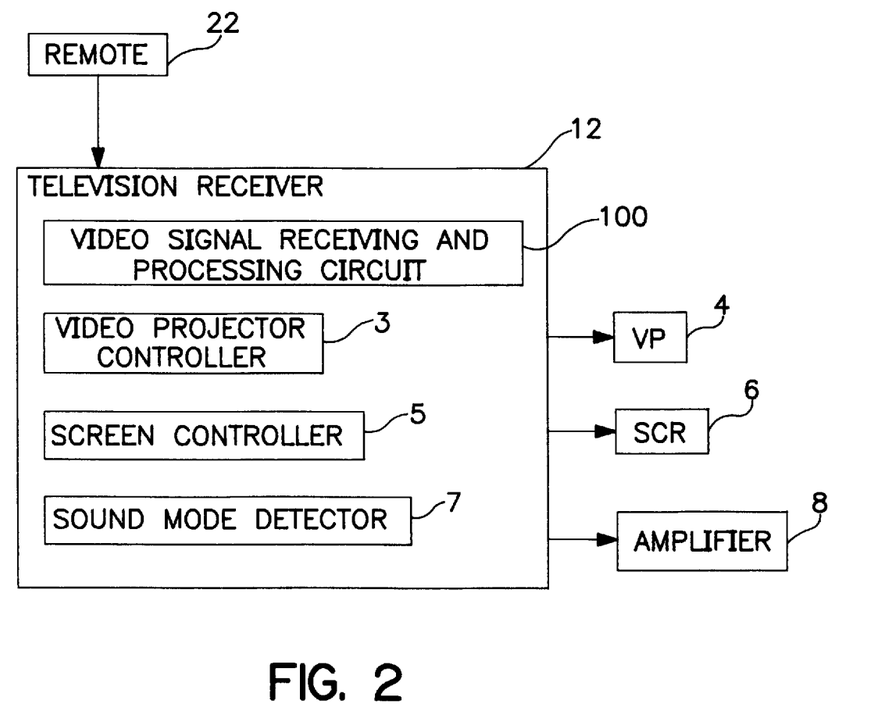
FIG. 2 is a block diagram of a large screen video display system in accordance with a second exemplary embodiment of the present invention.

FIG. 2 is a block diagram of a large screen video display system in accordance with a second exemplary embodiment of the present invention.

The television receiver 12 includes a sound mode detector 7 in addition to the components included in the first exemplary embodiment. The large screen video display system includes a 3-1 stereophonic system audio amplifier 8: as-an external component, in addition to the components provided in the first exemplary embodiment. The command signal from the remote control 22 is sent to the 3-1 stereophonic system audio amplifier 8 through the television receiver 12. In particular, the sound mode detector 7, located within the receiver 12, provides an audio amplifier control signal to the audio amplifier 8 to control the operation of the audio amplifier 8. Thus, an optimum sound field can be automatically set for the 3-1 stereophonic system audio amplifier 8.

Because the television receiver does not include an audio amplifier in this case, an audio amplifier is necessary to configure a surround system.

Because the surround mode (the mode name is called hall mode, stadium mode, theater mode, etc. by manufacturers) is arbitrarily selected at the audio amplifier 8 connected to the television receiver, a surround mode which is quite independent of the television receiver may be selected.

The television receiver 12, for example, can receive a MUSE system High vision broadcast. The MUSE system High vision broadcast provides sound modes which include a mode in which the reproduced condition is in a digital code form. However, the surround mode selected by the user can not always be reproduced at the receiver side from the broadcast sound. Therefore, the system is designed to automatically select the sound mode at the receiver side according to a change in the sound mode at the broadcast side.

Here, the 3-1 stereophonic system is a sound reproducing system including three channels, right (R), left (L), center (C) and a surround channel (S).

(Third exemplary embodiment)

Figure 3:
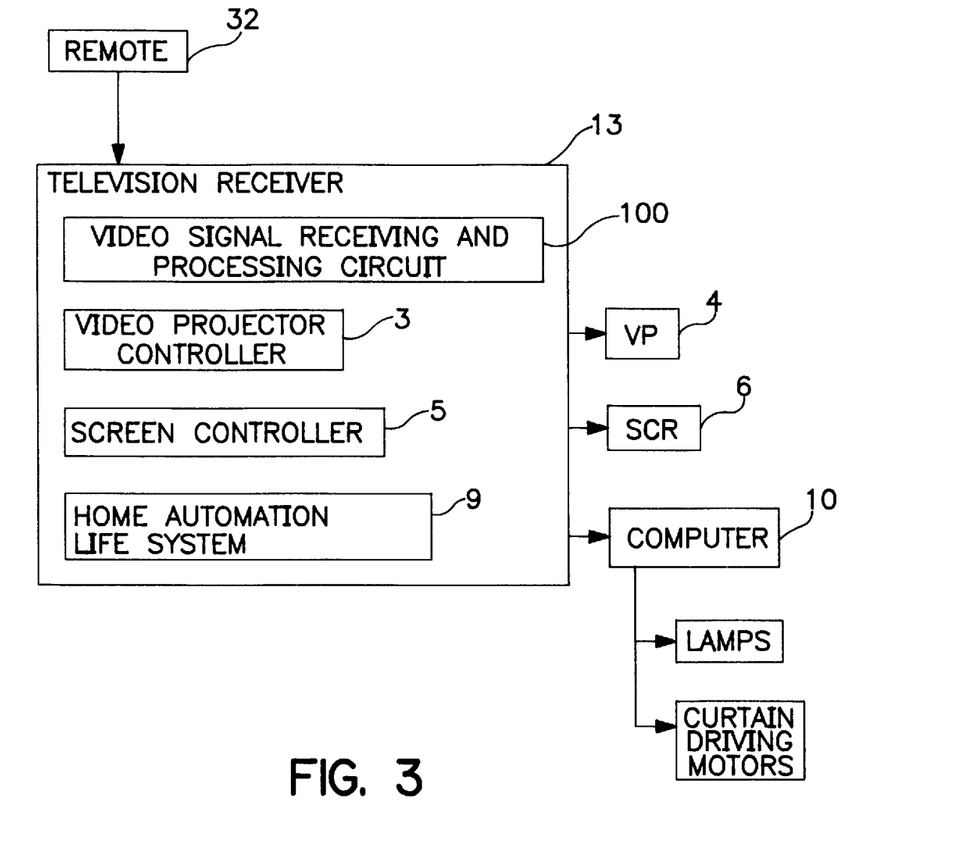
FIG. 3 is a block diagram of a large screen video display system in accordance with a third exemplary embodiment of the present invention.

FIG. 3 is a block diagram of a large screen video display system in accordance with a third exemplary embodiment of the present invention.

The television receiver 13 includes a control circuit for a home automation life system 9 in addition to the components of the first exemplary embodiment. The large screen video display system includes, as an external component, a computer 10 for controlling a home automation life system, in addition to the components included in the first exemplary embodiment. The computer 10 for controlling the home automation life system is connected to equipment in a home such as lamps and curtain driving motors for controlling that equipment.

The computer 10 for controlling the home automation life system detects activation of the television receiver 13 by operating the remote control 32. In response to activation of the television receiver, equipment controlled by computer 10 is automatically adjusted. For example, the lights may be darkened and the curtains on the windows may be closed.

(Fourth exemplary embodiment)

Figure 4:
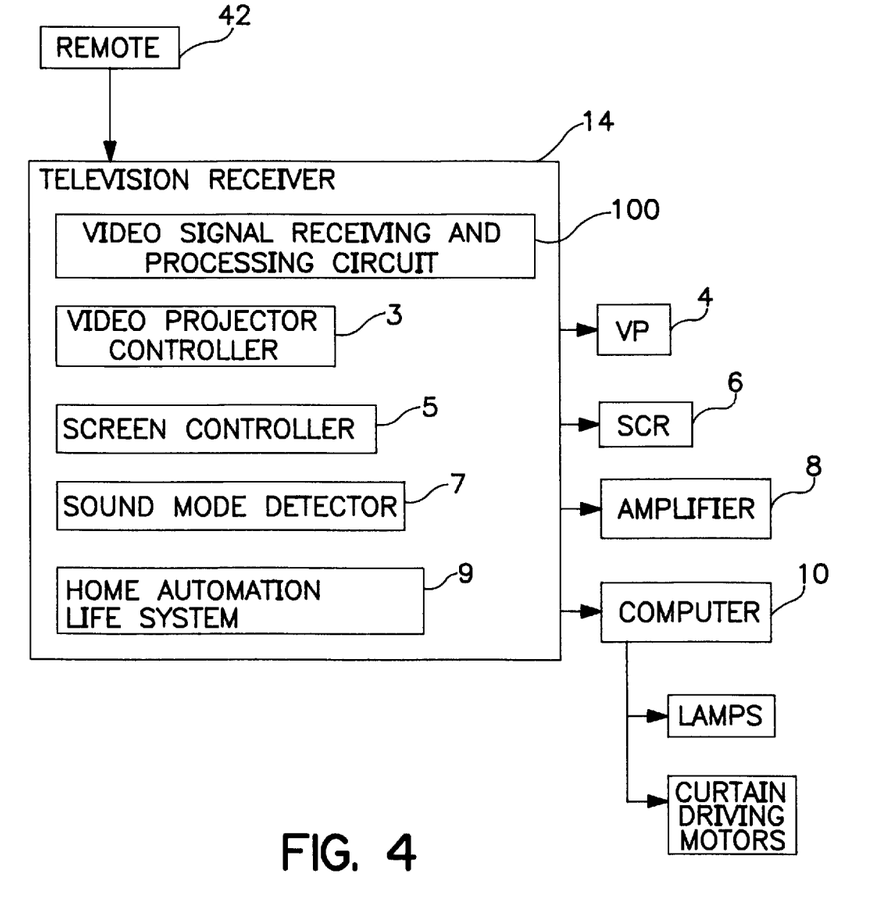
FIG. 4 is a block diagram of a large screen video display system in accordance with a fourth exemplary embodiment of the present invention.

FIG. 4 is a block diagram of a large screen video display system in accordance with a fourth exemplary embodiment of the present invention.

Provided is a television receiver 14 which includes a sound mode detector 7, in addition to the components included in the third exemplary embodiment. The large screen video display system includes, as an external component, a 3-1 stereophonic system audio amplifier 8, in addition to the composition of the third exemplary embodiment.

A user provides command signals to the television receiver 14 through a remote control component 42. In response to a specified command signal, a detecting signal is sent from a control circuit for the home automation life system 9 provided in the television receiver 14 to the 3-1 stereophonic system audio amplifier 8. Accordingly, an optimum sound field can be automatically set. By connecting a home theater system and an audio system to the home automation life system, video, audio, and conditions in the home, such as lighting, are linked to each other. As a result, each can be automatically controlled and their state or status can be detected. A home theater includes, for example, a large screen television and a stereophonic sound system having two dimensional sterophonic sound usually 3-1 stereophonic sound which produce pictures and sound to replicate a movie theater.

(Fifth exemplary embodiment)

Figure 5:
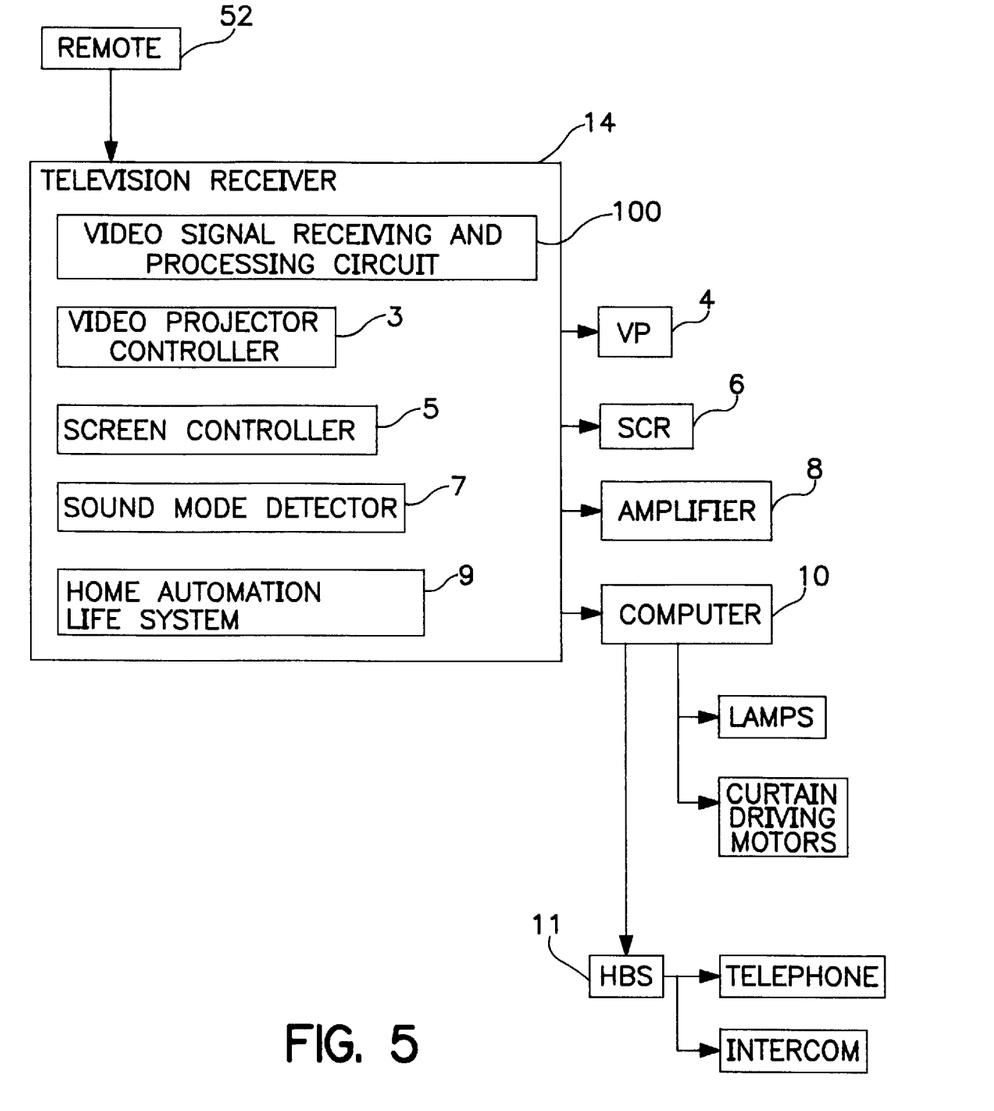
FIG. 5 is a block diagram of a large screen video display system in accordance with a fifth exemplary embodiment of the present invention.

FIG. 5 is a block diagram of a large screen video display system in accordance with a fifth exemplary embodiment of the present invention.

A home bus 11 is provided as an external component to connect with other equipment in the house, in addition to the components provided in the fourth exemplary embodiment. For example, when movies are seen with a video projector, the condition of the room is automatically set as well as other home components which are adjusted and controlled as necessary. When a visitor comes or there is a telephone call during a movie, the room is lit, the movie is temporally stopped, and the sound volume is temporally decreased. All these actions are automatically performed. In addition to lighting and sound, other components or equipment in the home can be controlled and adjusted.

In a large screen video display system or a is television receiver in accordance with the exemplary embodiments of the present invention, the equipment functioning as a control center automatically judges which user remote control is being used and controls the components in the system in response to the remote control. As a result, there is no need to handle multiple remote controls. Thus, the complexity of controlling a large screen system including many components is reduced allowing users to easily operate the system.

The invention may be embodied in other specific form without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A large screen picture display system for use with a controller for providing a plurality of command signals comprising:

(1) an audio amplifier;
   (2) a separated type video projector comprising
       (a) a video projector, and
       (b) a screen; and
   (3) a television receiver for receiving the plurality of command signals comprising
       (a) receiving and processing means contained in said television receiver for selectively processing a video signal responsive to at least one of the plurality of command signals and outputting said video signal to said video projector,
       (b) video projector control means contained in said television receiver for selectively providing a projector control signal responsive at least one of to the plurality of command signals to said video projector to control the operation of said video projector,
       (c) screen control means contained in said television receiver for selectively providing a screen control signal to said screen responsive to at least one of the plurality of command signals to permit or prevent display of an image from said video projector on said screen, and
       (d) sound mode detecting means contained in said television receiver for selectively providing an audio amplifier control signal responsive to at least one of the plurality of command signals to said audio amplifier to control the operation of said audio amplifier, wherein at least two of:
i) said video signal
ii) said projector control signal
iii) said screen control signal and
iv) said audio amplifier control signal
are generated in response to one command signal of said plurality of command signals from said controller.

2. A large screen picture display system for use with a controller for providing a plurality of command signals comprising:
(1) an audio amplifier;
(2) computer means for selectively controlling a home automation life system, said home automation life system controlling lighting conditions in the home, and
(3) a separated type video projector comprising
  (a) a video projector, and
  (b) a screen; and
(4) a television receiver responsive to at least one of the plurality of command signals comprising
  (a) receiving and processing means contained in said television receiver for selectively processing a video signal responsive to at least one of the plurality of command signals and outputting said video signal to said video projector,
  (b) video projector control means contained in said television receiver for selectively providing a projector control signal to said video projector responsive to at least one of the plurality of command signals to control the operation of said video projector,
  (c) screen control means contained in said television receiver for selectively providing a screen control signal to said screen responsive to at least one of the plurality of command signals to permit or prevent display of an image from said video projector on said screen,
  (d) sound mode detecting means contained in said television receiver for selectively providing an audio amplifier control signal to said audio amplifier responsive to at least one of the plurality of command signals to control the operation of said audio amplifier, and
  (e) home automation life system control means contained in said television receiver and coupled to said computer means for selectively providing a home automation life system control signal to the computer means responsive to at least one of the plurality of command signals to control the operation of the home automation life system, wherein at least two of:
i) said video signal
ii) said projector control signal
iii) said screen control signal
iv) said audio amplifier control signal and
v) said home automation life system control signal
are generated in response to one command signal of said plurality of command signals from said controller.

3. A large screen picture display system for use with a controller for providing a plurality of command signals comprising:
(1) an audio amplifier having a surround mode;
(2) computer means for selectively controlling a home automation life system, said home automation life system controlling lighting conditions in the home;
(3) a home bus system; and
(4) a separated type video projector comprising
  (a) a video projector, and
  (b) a screen;
(5) a television receiver for receiving the plurality of command signals comprising
  (a) receiving and processing means contained in said television receiver for selectively processing a video signal responsive to at least one of the plurality of command signals and outputting said video signal to said video projector,
  (b) video projector control means contained in said television receiver for selectively providing control signal to said video projector responsive to at least one of the plurality of command signals to control the operation of said video projector,
  (c) screen control means contained in said television receiver for selectively providing a screen control signal to said screen responsive to at least one of the plurality of command signals to permit or prevent display of an image from said video projector on said screen,
  (d) sound mode detecting means contained in said television receiver for selectively providing an audio amplifier control signal responsive to at least one of the plurality of command signals to said audio amplifier to control the operation of said audio amplifier, and
  (e) home automation life system control means contained in said television receiver and coupled to said computer means for selectively providing a home automation life system control signal to the computer means responsive to at least one of the plurality of command signals to control the operation of the home automation life system;

wherein said home automation life system is controlled by the home automation life system control signal provided through said home bus system, and at least two of:
i) said video signal
ii) said projector control signal
iii) said screen control signal
iv) said audio amplifier control signal and
v) said home automation life system control signal
are generated in response to one command signal of said plurality of command signals from said controller.

4. A television receiver for use with a controller for providing a plurality of command signals comprising:

receiving and processing means contained in said television receiver of a video signal for selectively outputting said video signal responsive to at least one of the plurality of command signals to a video projector;

video projector control means contained in said television receiver for selectively providing a projector control signal to said video projector responsive to at least one of the plurality of command signals to control the operation of said video projector;

screen control means contained in said television receiver for selectively providing a screen control signal to a screen responsive to at least one of the plurality of command signals to permit or prevent display of an image from said video projector on said screen; and a sound mode detecting means contained in said television receiver for selectively providing an audio amplifier control signal to an audio amplifier responsive to at least one of the plurality of command signals to control the operation of said audio amplifier, wherein at least two of:

i) said video signal ii) said projector control signal iii) said screen control signal and iv) said audio amplifier control signal are generated in response to one command signal of said plurality of command signals from said controller.

5. A television receiver for use with a controller for providing a plurality of command signals comprising:

receiving and processing means contained in said television receiver for selectively processing a video signal and outputting said video signal responsive to at least one of the plurality of command signals to said video projector;

video projector control means contained in said television receiver for selectively providing a projector control signal to a video projector responsive to at least one of the plurality of command signals to control the operation of said video projector;

screen control means contained in said television receiver for selectively providing a screen control signal to a screen responsive to at least one of the plurality of command signals to permit or prevent display of an image from said video projector on said screen; and home automation life system control means contained in said television receiver for selectively providing a home automation life system control signal to a home automation life system responsive to at least one of the plurality of command signals to control the operation of the home automation life system, said home automation life system controlling lighting conditions in the home, wherein at least two of:

i) said video signal ii) said projector control signal iii) said screen control signal and iv) said home automation life system control signal are generated in response to one command signal of said plurality of command signals from said controller.

6. A television receiver for use with a controller for providing a plurality of command signals comprising:

receiving and processing means contained in said television receiver for selectively processing a video signal and outputting said video signal to a video projector responsive to at least one of the plurality of command signals;

video projector control means contained in said television receiver for selectively providing a projector control signal to said video projector responsive to at least one of the plurality of command signals to control the operation of said video projector;

screen control means contained in said television receiver for selectively providing a screen control signal to a screen responsive to at least one of the plurality of command signals to permit or prevent display of an image from said video projector on said screen;

sound mode detecting means contained in said television receiver for selectively providing an audio amplifier control signal to an audio amplifier responsive to at least one of the plurality of command signals to control the operation of said audio amplifier; and home automation life system control means contained in said television receiver for selectively providing a home automation life system control signal to a home automation life system responsive to at least one of the plurality of command signals to control the operation of the home automation life system, said home automation life system controlling lighting conditions in the home, wherein at least two of:

i) said video signal ii) said projector control signal iii) said screen control signal iv) said audio amplifier control signal and v) said home automation life system control signal are generated in response to one command signal of said plurality of command signals from said controller.

7. A television receiver for use with a controller for providing a plurality of command signals comprising:

receiving and processing means contained in said television receiver for selectively processing a video signal and outputting said video signal to said video projector responsive to at least one of the plurality of command signals;

video projector control means contained in said television receiver for selectively providing a projector control signal to a video projector responsive to at least one of the plurality of command signals to control the operation of said video projector;

screen control means contained in said television receiver for selectively providing a screen control signal to a screen responsive to at least one of the plurality of command signals to permit or prevent display of an image from said video projector on said screen;

sound mode detecting means contained in said television receiver for selectively providing an audio amplifier control signal to an audio amplifier responsive to at least one of the plurality of command signals to control the operation of said audio amplifier; and home automation life system control means contained in said television receiver for selectively providing a home automation life system control signal to a home automation life system responsive to at least one of the plurality of command signals to control the operation of the home automation life system, said home automation life system controlling lighting conditions in the home;

wherein the operation of said home automation life system is controlled through a home bus system coupled to said home automation life system in response to the home automation life system control signal and, at least two of:

i) said video signal ii) said projector control signal iii) said screen control signal iv) said audio amplifier control signal and v) said home automation life system control signal are generated in response to one command signal of said plurality of command signals from said controller.

8. A large screen picture display system for use with a controller for providing a plurality of command signals comprising:

(1) a separated type video projector comprising
  (a) a video projector, and
  (b) a screen; and
(2) a television receiver for receiving the plurality of command signals comprising
  (a) receiving and processing means contained in said television receiver for selectively processing a video signal responsive to at least one of the plurality of command signals and outputting said video signal to said video projector,
  (b) video projector control means contained in said television receiver for selectively providing a projector control signal responsive to at least one of the plurality of command signals to said video projector to control die operation of said video projector, and
  (c) screen control means contained in said television receiver or selectively providing a screen control signal to said screen responsive to at least one of the plurality of command signals to permit or prevent display of an image from said video projector on said screen, wherein at least two of:
i) said video signal
ii) said projector control signal and
iii) said screen control signal
are generated in response to one command signal of said plurality of command signals from said controller.

9. A large screen picture display system for use with a controller for providing a plurality of command signals comprising:
(1) computer means for selectively controlling a home automation life system, said home automation life system controlling lighting conditions in the home;
(2) a separated type video projector comprising
  (a) a video projector, and
  (b) a screen;
(3) a television receiver for receiving the plurality of command signals comprising
  (a) receiving and processing means contained in said television receiver for selectively processing a video signal responsive to at least one of the plurality of command signals and outputting said video signal to said video projector,
  (b) video projector control means contained in said television receiver for selectively providing a projector control signal responsive to at least one of the plurality of command signals to said video projector to control the operation of said video projector,
  (c) screen control means contained in said television receiver for selectively providing a screen control signal to said screen responsive to at least one of the plurality of command signals to permit or prevent display of an image from said video projector on said screen, and
  (d) home automation life system control means contained in said television receiver and coupled to said computer means for selectively providing a home automation life system control signal to the computer means responsive to at least one of the plurality of command signals to control the operation of the home automation life system, wherein at least two of:
i) said video six
ii) said projector control signal
iii) said screen control signal and
iv) said home automation life system control signal
are generated in response to one command signal of said plurality of command signals from said controller.

10. A television receiver for use with a controller for providing a plurality of command signals comprising:
receiving and processing means contained in said television receiver for selectively processing a video signal and outputting said video signal responsive to at least one of the plurality of command signals to said video projector;
video projector control means contained in said television receiver for selectively providing a projector control signal to a video projector responsive to at least one of the plurality of command signals to control the operation of said video projector; and
screen control means contained in said television receiver for selectively providing a screen control signal to a screen responsive to at least one of the plurality of command signals to permit or prevent display of an image from said video projector on said screen, wherein at least two of:
i) said video signal
ii) said projector control signal and
iii) said screen control signal
are generated in response to one command signal of said plurality of command signals from said controller.

\* \* \* \* \*

UNITED STATES PATENT AND TRADE MARK OFFICE
CERTIFICATE OF CORRECTION

PATENT NO.    : 5,815,219
DATED         : September 29, 1998
INVENTOR(S)   : Okuizumi It is certified that error appears in the above-identified patent and that said Letters Patent is hereby corrected as shown below:

Column 9, line 15, "die" should be --the--.

Column 9, line 17, "or" should be --for--.

Column 10, line 16, "six" should be --signal--.

Signed and Sealed this

Twenty-third Day of March, 1999

Attest:

Q. TODD DICKINSON

*Attesting Officer*            *Acting Commissioner of Patents and Trademarks*